United States Patent
Feuersaenger et al.

(10) Patent No.: US 9,915,517 B2
(45) Date of Patent: Mar. 13, 2018

(54) METHOD AND DEVICE FOR DETERMINING A ROTOR POSITION OF AN ELECTRONICALLY COMMUTATED ELECTRIC MACHINE

(71) Applicant: ABB Technology AG, Zürich (CH)

(72) Inventors: Simon Feuersaenger, Siegen (DE); Mario Pacas, Siegen (DE); Christian Stulz, Zürich (CH)

(73) Assignee: ABB Schweiz AG, Baden (CH)

( * ) Notice: Subject to any disclaimer, the term of this patent is extended or adjusted under 35 U.S.C. 154(b) by 699 days.

(21) Appl. No.: 14/467,471

(22) Filed: Aug. 25, 2014

(65) Prior Publication Data

US 2015/0057970 A1 Feb. 26, 2015

(30) Foreign Application Priority Data

Aug. 26, 2013 (EP) .................................. 13181724

(51) Int. Cl.
| | |
|---|---|
| G01B 7/00 | (2006.01) |
| H02P 1/46 | (2006.01) |
| H02P 27/04 | (2016.01) |
| G01B 7/30 | (2006.01) |
| H02P 6/185 | (2016.01) |
| H02P 6/18 | (2016.01) |

(52) U.S. Cl.
CPC .............. *G01B 7/003* (2013.01); *G01B 7/30* (2013.01); *H02P 1/46* (2013.01); *H02P 27/04* (2013.01); *H02P 6/18* (2013.01); *H02P 6/185* (2013.01)

(58) Field of Classification Search
None
See application file for complete search history.

(56) References Cited

U.S. PATENT DOCUMENTS

| 7,047,150 B2 * | 5/2006 | Nemeth-Csoka | H02P 25/024 318/400.02 |
| 2009/0096396 A1 * | 4/2009 | Sieber | H02P 6/185 318/400.33 |
| 2011/0304290 A1 * | 12/2011 | Ito | H02P 6/185 318/400.32 |

OTHER PUBLICATIONS

European Search Report dated Jan. 23, 2014.
Simon Feuersanger et al., Initial Rotor Position Identifiecation in Medium Voltage Synchronous Machines, 38 the Annual Conference on IEEE Industrial Electronics Society, Oct. 2012, pp. 1852-1857, XP-032281267.

(Continued)

*Primary Examiner* — John Kuan
(74) *Attorney, Agent, or Firm* — Taft Stettinius & Hollister LLP

(57) ABSTRACT

A method is disclosed for determining a rotor position of an electrically excited electrical machine by injecting voltage test signals at a plurality of space vector angles with a fundamental frequency which lies in a frequency range in which there is a difference in admittance in space vector angles; calculating resulting values of an excitation current indicator variable as Fourier coefficients of the excitation current resulting from the voltage test signal with reference to the fundamental frequency of the voltage test signal at the corresponding space vector angles; and determining the rotor position on the basis of the profile of the excitation current indicator variable.

14 Claims, 7 Drawing Sheets

(56) References Cited

OTHER PUBLICATIONS

Joachim Holtz et al., "Initial Rotor Polarity Detection and Sensorless Control of PM Synchronous Machines", Industry Applications Conference, 41st IAS Annual Meeting, Conference Record of the 2006 IEEE, vol. 4, 8.-12, Oct. 2006, pp. 2004-2047.

Simon Feuersanger and Mario Pacas., "Initial Rotor Position Detection in Electrically Excited Medium Voltage Synchronous Machines", PCIM 2012, Nürnberg, Germany, May 8-10, 2012, 8 pages.

* cited by examiner

METHOD AND DEVICE FOR DETERMINING A ROTOR POSITION OF AN ELECTRONICALLY COMMUTATED ELECTRIC MACHINE

RELATED APPLICATION

This application claims priority under 35 U.S.C. § 119 to European Patent Application No. 13181724.9 filed in Europe on Aug. 26, 2014, the entire content of which is hereby incorporated by reference in its entirety.

TECHNICAL FIELD

The invention relates to electronically commutated electrical machines, in particular synchronous machines which are fed by current converters, and furthermore to actuation methods for such machines which are based on knowledge of the rotor position. Furthermore, the invention relates to measures for determining a rotor position in a sensorless manner.

PRIOR ART

To actuate electrically excited synchronous machines, knowledge of the present rotor position is necessary in order to be able to operate or regulate the electrical machine. The rotor position can be detected, for example by a position sensor which can be arranged, for example, on the rotor shaft.

For reasons of cost and in order to reduce the likelihood of failure, provision is made for many areas of application to dispense with a position sensor for detecting the rotor position and instead to determine the rotor position using electrical variables. Methods are often used which calculate a section of the profile of the induced voltage in the stator windings and assign the instants of their zero crossings to a particular rotor position. However, such a method is not precise since the induced voltages are very low at low rotational speeds and the detection thereof, in particular owing to disturbing variables, can therefore only be done imprecisely. In particular in the case of an acceleration of the electrical machine from a standstill, however, the knowledge of the rotor position is necessary since actuation which is not matched to the rotor position can lead to an uncontrolled movement of the electrical machine.

However, if the rotor starting position is correctly calculated using a suitable method, the run-up of the electrical machine is possible if it is quickly accelerated to a relatively high rotational speed at which the above methods which calculate the rotor position via the evaluation of the profile of the induced voltage can be used without a problem.

In order to obtain an indication of the rotor position by evaluation of electrical variables in the case of electrically excited synchronous machines, an excitation current method can be provided, for example. In this case, the stator winding is short-circuited and an excitation current through an excitation winding in the rotor is increased as quickly as possible. Owing to the change in the state of magnetization of the electrical machine, a voltage is now induced in the stator winding, with the result that a stator space vector is formed which points in the negative direction of the d axis. Said current can be evaluated and allows the angular position of the d axis to be determined, from which angular position of the d axis an indication of the rotor position can be calculated.

Furthermore, by injecting high-frequency voltage variables into the stator winding in different directions, electrical asymmetries in the rotor can be evaluated, from which conclusions can be drawn about the position of the rotor. For this purpose, the current responses of the high-frequency voltage pulses in the direction of the d and q axis (coordinate system which is fixed with respect to the rotor) of the machine must differ from one another so that it is possible to make a statement about the rotor position.

By way of example, the document J. Holtz, "Initial Rotor Polarity Detection and Sensorless Control of PM Synchronous Machines", Industry Applications Conference, $41^{st}$ IAS Annual Meeting, Conference Record of the 2006 IEEE, Vol. 4, 8-12 Oct. 2006, pp. 2004-2047, discloses a method for determining a rotor position of an electrical machine at a standstill or at low speeds on the basis of the injection of an oscillating high-frequency carrier signal. In order to eliminate ambiguous rotor position information arising from the injection of the high-frequency carrier signal, the polarity of the permanent magnet is determined by the injection of two short current pulses which have different mathematical signs and which are oriented in the direction of the estimated magnetic axis, while the saturation behavior of the main inductance is investigated. However, the damper windings of the electrical machine often hinder the evaluation of the state of saturation, with the result that the rotor position can only be detected under particular conditions using said method.

In the document Feuersänger, S., Pacas, M., "Initial Rotor Position Detection in Electrically Excited Medium Voltage Synchronous Machines", PCIM 2012, Nuremberg, Germany, 8-10 May 2012, a method is disclosed which is based on the injection of low-frequency signals, with the result that the damper windings of the electrical machine do not hinder an evaluation of the state of saturation of the machine. The low-frequency voltage pulses which are injected into the stator winding are selected at a pulse frequency at which the electrical machine has the greatest difference between the d component and the q component of the admittances. This frequency range is usually between 1 and some 10 Hz, with the result that it is possible to identify the rotor position via a difference in admittance in the case of excitation with voltage pulses in this frequency range.

In order to use the difference in admittance for the frequency range in question to identify the rotor position, voltage test signals are injected into the stator winding, wherein an excitation current must be allowed through the excitation winding of the rotor since, otherwise, high overvoltages can occur in the excitation winding. In the case of this method, the voltage test signals must be injected into the stator winding in different space vector directions, with the result that the current responses can be checked at various positions. The resulting current responses of the stator current and of the excitation current are dependent on the angular difference between the space vector of the injected test signal and that of the actual d axis of the rotor. However, the directions of the voltage pulses cannot be determined in advance in the case of this method; rather, they orient themselves inter alia according to the results of the measurements of the current responses of the previous voltage pulses. The directions of the resulting voltage pulses are thus arbitrary, which leads, in particular in the case of medium-voltage converters that operate with low clock frequency, to imprecise results since the voltage pulses cannot be reproduced well.

The rms value of the stator current component in the pulse direction is calculated as indicator variable for the stator current during the injection of the voltage pulse. An excitation current indicator is calculated according to the mathematical sign of the excitation current change during a first quarter of the injected pulse. The DC component and the peak value are calculated from the rms value of the stator current component, and hence four possible rotor position angles are determined. To select the rotor position angles which correspond to the actual rotor position, two further pulses are now injected at the calculated rotor position angle and the corresponding indicator variables are measured. Depending on the angular position at which the stator current indicator has a local maximum, and depending on a mathematical sign of the excitation current indicator, the present rotor position can then be calculated.

Since, in particular in the case of medium-voltage converters for operating the electrical machine, the period of the modulation method must be selected to be comparatively long for technical reasons, the generation of the voltage pulses to be injected is correspondingly connected to the period of the modulation method used to operate the electrical machine. The resulting responses in the stator current and excitation current thus have a considerable harmonic component, which, in particular in the case of the excitation current indicator mentioned above, can lead to measurement errors since said excitation current indicator is formed by measuring the excitation current at two instants.

DISCLOSURE OF THE INVENTION

An object of the present invention therefore consists in providing an improved method for calculating the rotor position of an electrically excited electrical machine at a standstill or in the range close to a standstill, by means of which method a more reliable evaluation is possible in the case of the use of medium-voltage converters with a long period of the modulation method.

This object is achieved by means of the method for determining the rotor position at a standstill of an electrically excited electrical machine according to Claim 1 and by means of the device, the motor system and the computer program product according to the coordinate claims.

Further advantageous configurations are specified in the dependent claims.

According to a first aspect, a method for determining a rotor position of an electrically excited electrical machine is provided, comprising the following steps:
  injecting voltage test signals at a plurality of space vector angles with a fundamental frequency which lies in a frequency range in which there is a difference in admittance in space vector angles which are, in particular, offset by 90°;
  calculating the respective resulting values of an excitation current indicator variable as Fourier coefficients of the excitation current resulting from the voltage test signal with reference to the fundamental frequency of the voltage test signal at the corresponding space vector angles; and
  determining the rotor position on the basis of the profile of the excitation current indicator variable.

The above method proposes the use of an indicator variable which can be calculated, when voltage test signals are injected, from the profile of the stator current and of the excitation current. In particular, the indicator variable corresponds to the Fourier coefficient at the excitation frequency of the voltage test signals.

The method can also comprise the following steps:
  calculating the respective resulting values of a stator current indicator variable as Fourier coefficients of the stator current resulting from the voltage test signal with reference to the fundamental frequency of the voltage test signal at the corresponding space vector angles; and
  determining the rotor position on the basis of the respective profile of the stator current indicator variable and the excitation current indicator variable.

As a result, the indicator variables are selected such that only those components of the stator current and of the excitation current which lie in the frequency range of the excitation of the voltage test signals are evaluated. As a result, harmonic components remain disregarded. The indicator variables thus calculated exhibit period profiles over the electrical angular position of the rotor, wherein a local maximum of the stator current indicator and a local minimum of the excitation current indicator indicate the actual angular position of the rotor. In the case of a medium-voltage drive having a medium-voltage converter with a relatively long period of the modulation method, the indicator variables proposed above have proven to be substantially more robust than in methods up to now.

Furthermore, it is advantageous that the voltage pulses to be injected are, for the most part, injected into the stator winding in predefined directions. The directions can be selected such that the voltage pulses can be realized in an optimum manner by a medium-voltage converter with a relatively long period of the modulation method.

Furthermore, the rotor position can be determined at the position of a minimum of the profile of the excitation current indicator variable.

According to an embodiment, the amplitudes of the odd and even component of the fundamental oscillation of the excitation current indicator variable can be calculated, wherein the rotor position is calculated from the amplitudes of the odd and even component.

It can be provided that the rotor position is determined as the angular position at which the profile of the stator current indicator variable has a local maximum and the corresponding excitation current indicator variable has a negative mathematical sign.

Furthermore, the amplitudes of the odd and even component of the second harmonic of the stator current indicator variable can be calculated, wherein an ambiguous indication of the rotor position is calculated from the amplitudes of the odd and even component, wherein a further voltage test signal is injected in the direction of a predefined estimated rotor position in order to eliminate the ambiguity by means of the mathematical sign of the then measured excitation current indicator variable.

In particular, the voltage test signal can be injected in the form of square-wave pulses.

According to another aspect, a device for determining a rotor position of an electrically excited electrical machine is provided, wherein the device is designed to:
  inject voltage test signals at a plurality of space vector angles with a fundamental frequency which lies in a frequency range in which there is a difference in admittance in space vector angles which are, in particular, offset by 90°;
  calculate the respective resulting values of an excitation current indicator variable as Fourier coefficients of the excitation current resulting from the voltage test signal with reference to the fundamental frequency of the voltage test signal at the corresponding space vector angles; and determine the rotor position on the basis of the profile of the excitation current indicator variable.

According to another aspect, a motor system having an electrical machine, a driver circuit for operating the electrical machine and the above device is provided.

According to another aspect, a computer program product is provided which contains a program code that, when executed on a data processing device, performs the above method.

BRIEF DESCRIPTION OF THE DRAWINGS

Embodiments are explained in more detail in connection with the drawings and the following description. In the figures.

DESCRIPTION OF EMBODIMENTS

Figure 1:
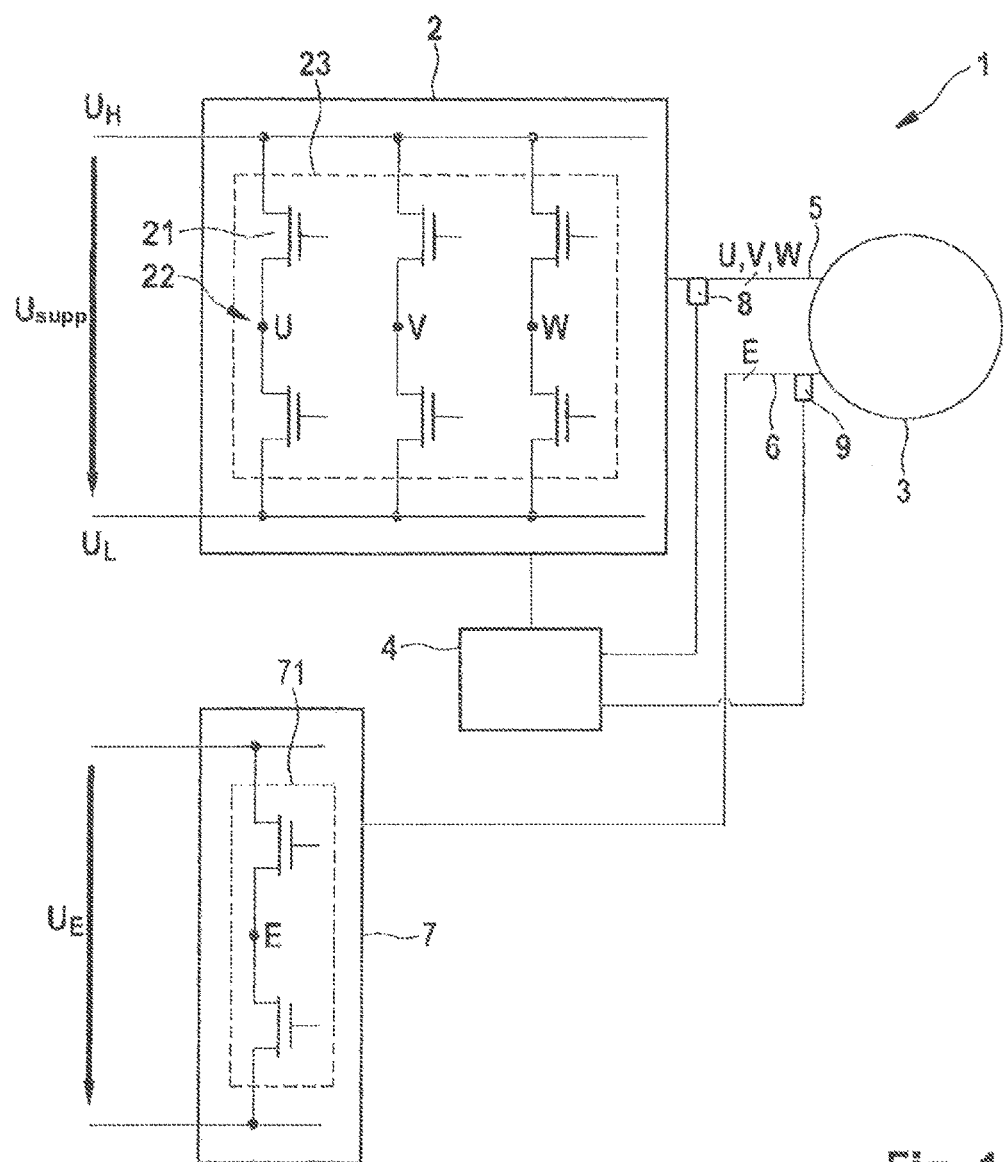
FIG. 1 shows a schematic illustration of a motor system having an electrically excited electrical machine which is actuated via a driver circuit.

FIG. 1 shows a schematic illustration of a motor system 1 having a driver circuit 2 and an electrically excited electrical machine 3 (which is a three-phase machine in the example described below). The driver circuit 2 is used to provide phase voltages U, V, W for the stator windings 31 of the electrically excited electrical machine 3 and corresponding phase currents on the phase lines 5. The part of the driver circuit 2 for generating the phase voltages U, V, W can be embodied, for example, as a B6 converter 23, wherein the B6 converter has a plurality of inverter circuits 22 with in each case two series-connected semiconductor switches 21 which can preferably be designed as power semiconductor switches, for instance as power MOSFETs, thyristors, IGBTs, IGCTs or the like. The driver circuit 2 obtains the electrical energy for operating the electrical machine 3 from an applied supply voltage $U_{supp}$ Furthermore, an excitation circuit 7 can be provided, which excitation circuit has an excitation current converter 71. The excitation current converter 71 is fed from an excitation supply voltage $U_E$, which is lower than the supply voltage $U_{supp}$, and is designed to provide an excitation voltage E or an excitation current on the excitation current line 6 for an excitation winding 32 in a rotor, that is to say the rotor 33, of the electrical machine 3, wherein the excitation voltage E or the excitation current can be transferred to the rotor 33, for example, via wipers not shown. Alternatively, by means of the excitation voltage E, a magnetic field can also be generated outside of the rotor 33, which magnetic field is injected into the rotor 33 from the outside.

The phase lines 5 can be provided with phase current detectors 8 for measuring the phase currents and the excitation current line 6 can be provided with an excitation current detector 9 for measuring the excitation current.

The driver circuit 2 is actuated via a control unit 4 which actuates semiconductor switches 21 provided in the driver circuit 2 according to a modulation method or a commutation program in order to connect phase lines 5 or the excitation current line 6 to a high supply voltage potential $U_H$ or a low supply voltage potential $U_L$ of the supply voltage $U_{supp}$. The driver circuit 2 is connected to the phase current detectors 8 and the excitation current detector 9 in order to obtain indications about the flowing phase currents and the flowing excitation current. The driver circuit 2 is used to provide three phase voltages U, V, W (corresponding to the three-phase nature of the electrical machine 3), which in each case effect a space vector angle, an amplitude of the space vector and a stator magnetic field which is accordingly oriented and results therefrom.

Figure 2:
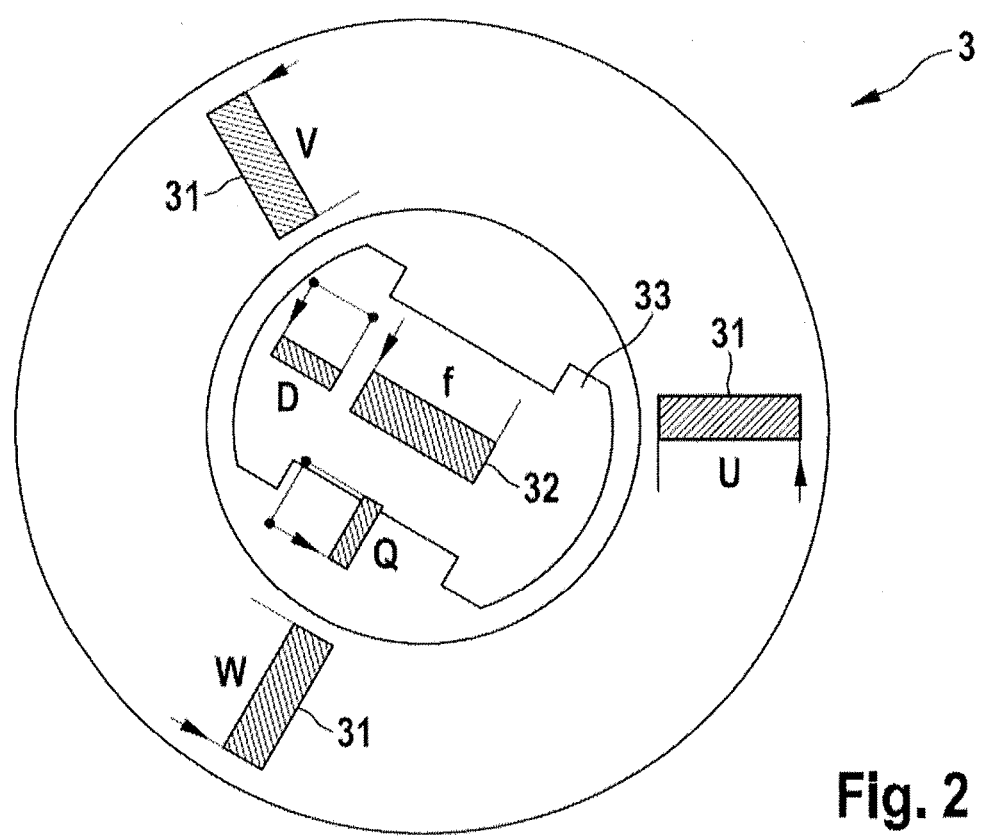
FIG. 2 shows a schematic illustration of the stator windings and the excitation winding in the electrically excited electrical machine from FIG. 1.

FIG. 2 illustrates a schematic illustration of the electrically excited electrical machine 3. The inductances effected by the stator winding 31 can be seen, which inductances are assigned to the three phase voltages U, V, W and are energized by these. The rotor 33 is provided with an excitation winding 32 which causes a corresponding inductance. Current and voltage vector components of the stator voltage, the direction of which corresponds in each case to the orientation of the excitation winding 32 in the rotor 33, correspond to a d component; the directions which run perpendicular thereto correspond to a q component of the space vector of the stator voltage. The d component and the q component correspond in each case to the directions of a coordinate system which is fixed with respect to the rotor.

Figure 3:
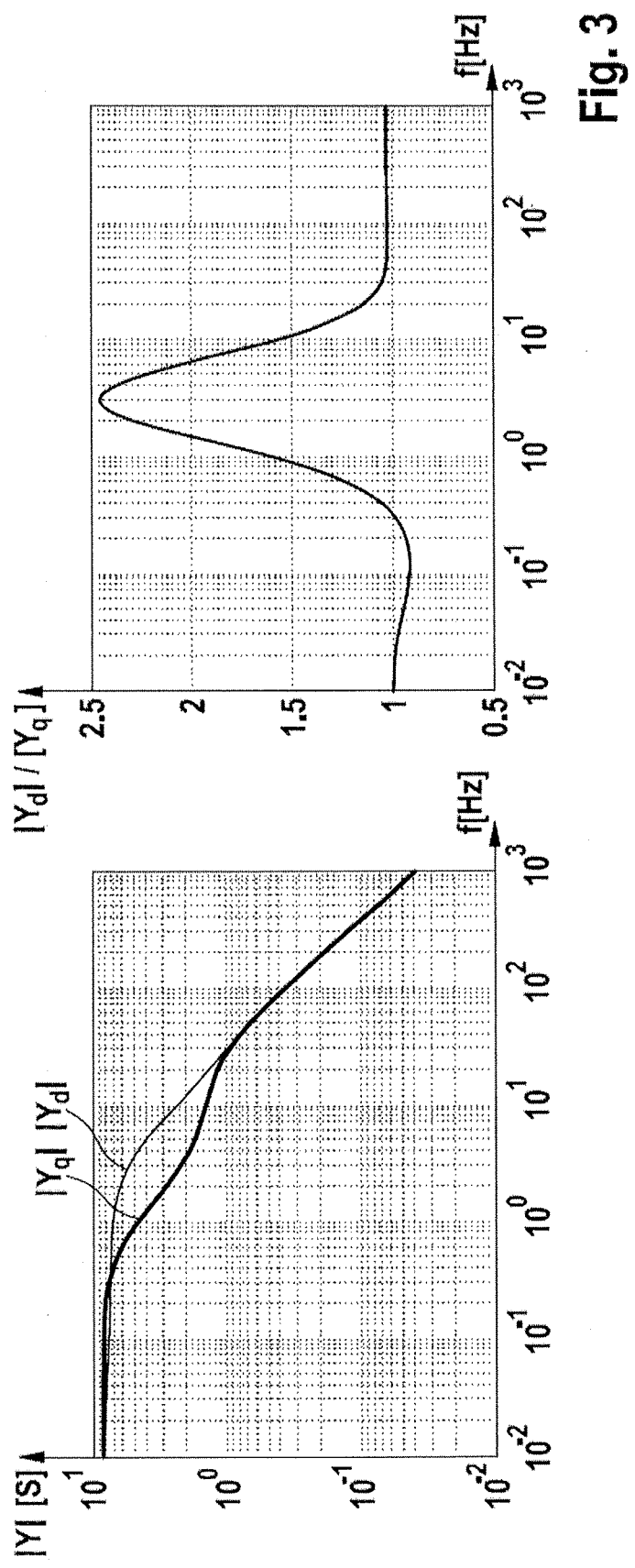
FIG. 3 shows an admittance frequency response for a synchronous machine.

FIG. 3 shows an admittance frequency response of the absolute admittances |Y| and the relative $|Y_d|/|Y_q|$ for a synchronous machine of the type of the electrical machine 3 in the case of a constant excitation current through the excitation winding 32. Such a frequency response is typical for synchronous machines and effects large differences in the amplitude response between the d component and the q component of the stator voltage in the frequency range between 1 and some 10 Hz; however, only small differences for higher frequencies. In the case of excitation of the stator winding 31 with high-frequency excitation voltages, it is thus possible to identify a rotor position, that is to say the rotor position, only to a limited extent via an evaluation of the difference in admittance.

Figure 4:
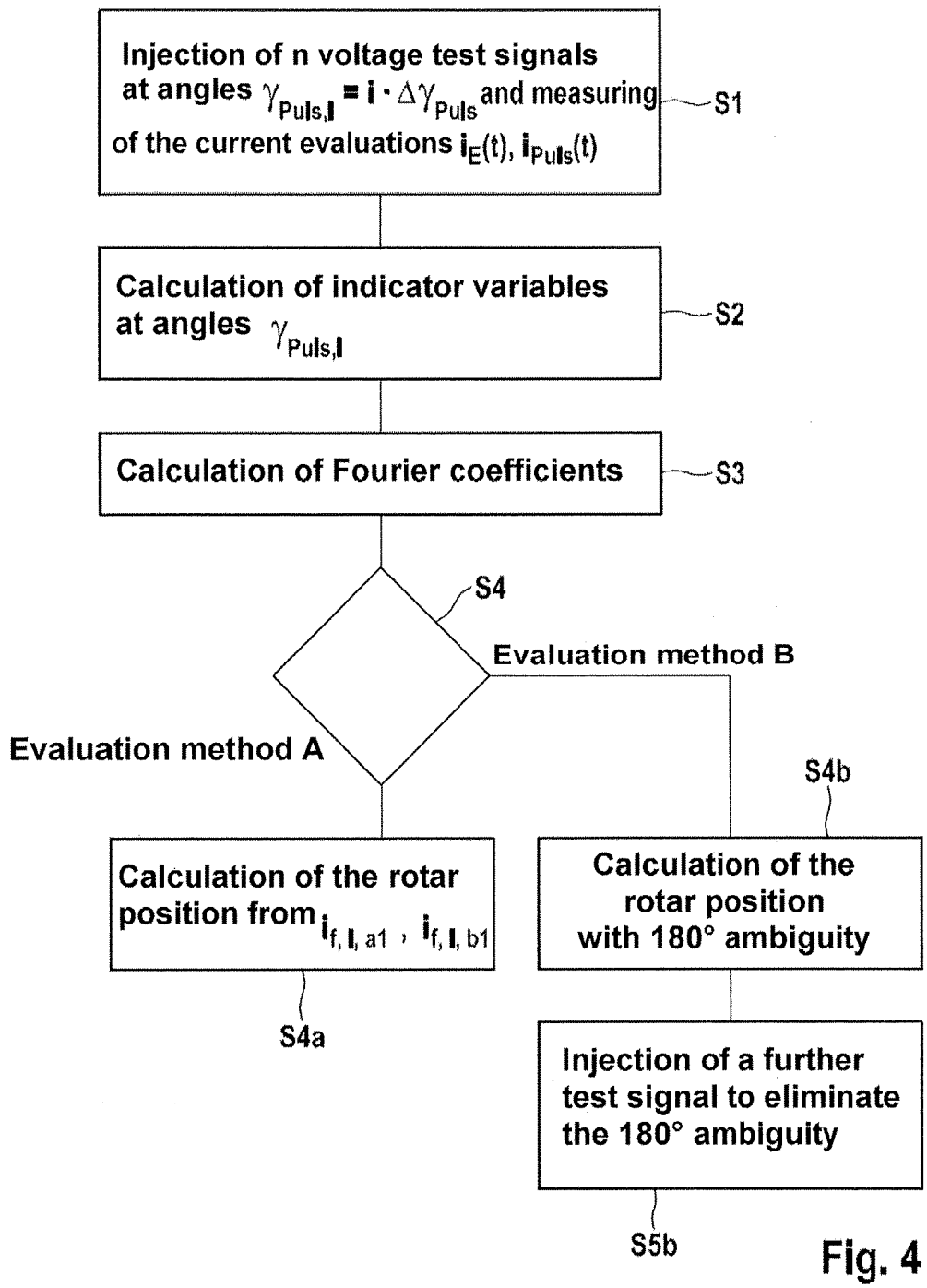
FIG. 4 shows a flow chart for illustrating a method for determining the rotor position of an electrical machine.

On the basis of the flow chart in FIG. 4, the method for determining the rotor position of the rotor 33 of the electrical machine 3 is described in more detail below.

In step S1, a voltage test signal is injected into the stator winding 31 and, more precisely, at a frequency which is in the frequency range of a significant difference between d component and q component of the admittances $|Y_d|$, $|Y_q|$ of the electrical machine 3. Said injection of the voltage test signal into the stator winding 31 is only permissible, however, in the case of excitation current flowing through the excitation winding 32 since otherwise overvoltages can occur on the excitation winding 32. In addition, the excitation current effects magnetization of the rotor 33 which can lead to an unwanted movement of the electrical machine 3 when the voltage test signals are applied. Therefore, the amplitude of the voltage test signals should generally not exceed 2% of the nominal voltage, preferably 1% of the nominal voltage, in particular 0.5% of the nominal voltage. The voltage test signals are applied to the stator windings 31 such that different space vector angles can be injected into the stator windings 31 in order to evaluate a corresponding current response at various space vector angles.

The space vector angle of the injected voltage test signal is denoted $\gamma_{Puls}$ in the following text. All of the space vector angles mentioned in the following text are to be understood as electrical position angles (electrical rotor position), that is to say including a pole pair number.

In the case of this method, voltage test signals with the following space vector angles are injected into the stator winding one after the other:

$$\gamma_{Puls,i} = i \cdot \Delta\gamma_{Puls} \quad i=0, 1, 2 \ldots (n-1)$$

wherein n represents the number of injected pulses. In the case of this method, the number of pulses n can be set to a value of 3 or more, as desired.

$\Delta\gamma_{Puls}$ denotes a constant angular spacing between two angles of the injected voltage test signal space vector. The angular spacing $\Delta\gamma_{Puls}$ has to be selected such that one of the two following equations is fulfilled:

$$n \cdot \Delta\gamma_{Puls} = 180°$$

or $$n \cdot \Delta\gamma_{Puls} = 360°$$

If the parameters n and $\Delta\gamma_{Puls}$ are selected according to the instructions described here, the rotor position can be calculated using the method described in step S4a or S4b.

It should be noted that an additional voltage test signal space vector can be injected with an angular value which is not predetermined, depending on the evaluation methods (see step S5b).

The individual stator voltages can be computed by means of a coordinate transformation, as follows:

$$u_\alpha(t) = u_{Puls}(t)\cos(\gamma_{Puls})$$

$$u_\beta(t) = u_{Puls}(t)\sin(\gamma_{Puls})$$

$$u_{U0}(t) = u_\alpha(t) = u_{puls}(t)\cos(\gamma_{puls})$$

$$u_{V0}(t) = u_\alpha(t)\cos(120°) + u_\beta(t)\cos(30°) = u_{Puls}(t)\cos(\gamma_{Puls}-120°)$$

$$u_{W0}(t) = u_\alpha(t)\cos(240°) + u_\beta(t)\cos(150°) = u_{Puls}(t)\cos(\gamma_{Puls}-240°)$$

wherein $u_\alpha(t)$, $u_\beta(t)$ correspond to voltage components of the stator voltage which are offset by 90° with respect to one another in a coordinate system which is fixed with respect to the stator and $u_{U0}(t)$, $u_{V0}(t)$, $u_{W0}(t)$ correspond to the individual for generating the voltage space vector of the stator voltage through the stator windings 31 which are arranged in a manner effectively offset by 120° with respect to one another.

The voltage test signals can be selected, for example, as pulse-shaped voltages since these are the easiest for the driver circuit 2 to reproduce in the case of relatively small amplitude values.

Figure 5:
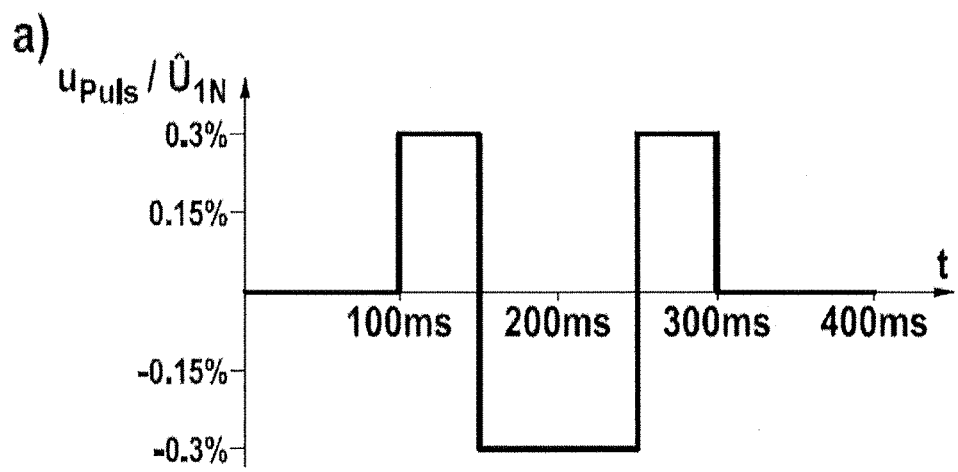
FIGS. 5a and 5b show an exemplary temporal profile of a possible voltage test signal and a corresponding pulse response of the stator current component in the space vector direction of the voltage test signal.
Figure 5:
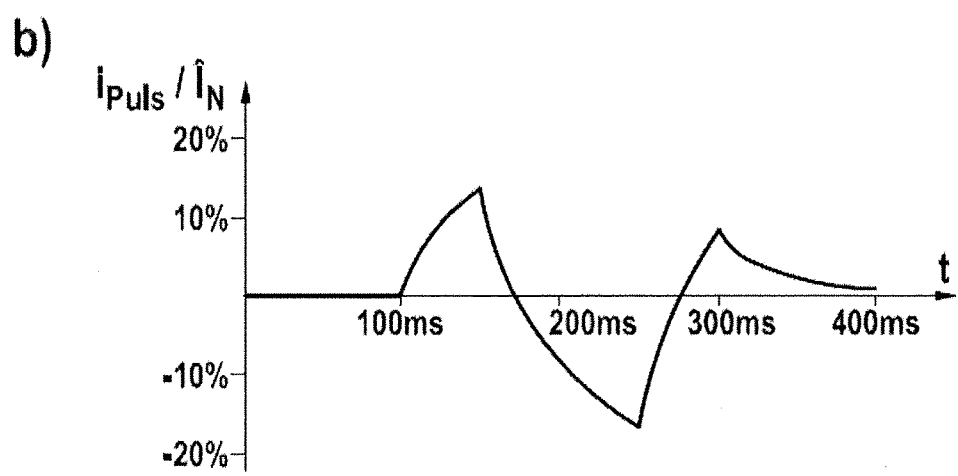

FIG. 5a illustrates by way of example a temporal profile of a possible voltage test signal which can be generated by means of a pulse-width-modulation of the driver circuit 2. A corresponding pulse response of the stator current component in the space vector direction of the voltage test signal is illustrated in FIG. 5b as $i_{Puls}(t)$. The stator current component can be calculated from the measured phase currents by coordinate transformation with the angle $\gamma_{Puls}$. The stator current component $i_{Puls}(t)$ thus has a space vector angle which corresponds to the space vector angle of the voltage test signal. The following applies:

$$i_{Puls}(t) = i_U(t)\cos(\gamma_{Puls}) + i_V(t)\cos(120°-\gamma_{Puls}) + i_W(t)\cos(240°-\gamma_{Puls}).$$

The frequency of the voltage test signal preferably corresponds to a frequency at which the difference in admittance between d and q axis can be detected. The resulting stator current and the resulting excitation current are dependent on the angular difference $\Delta\gamma = \gamma_{Puls} - \gamma$ between the angle of the injected voltage space vector $\gamma_{Puls}$ and the rotor position $\gamma$ and thus allow the rotor position to be determined.

During the injection of the respective voltage test signals in the respective directions, the resulting stator currents and excitation currents are measured or calculated and stored with reference to the space vector angle $\gamma_{Puls}$ of the voltage test signal $u_{Puls}(t)$ for the purpose of evaluation.

Figure 6:
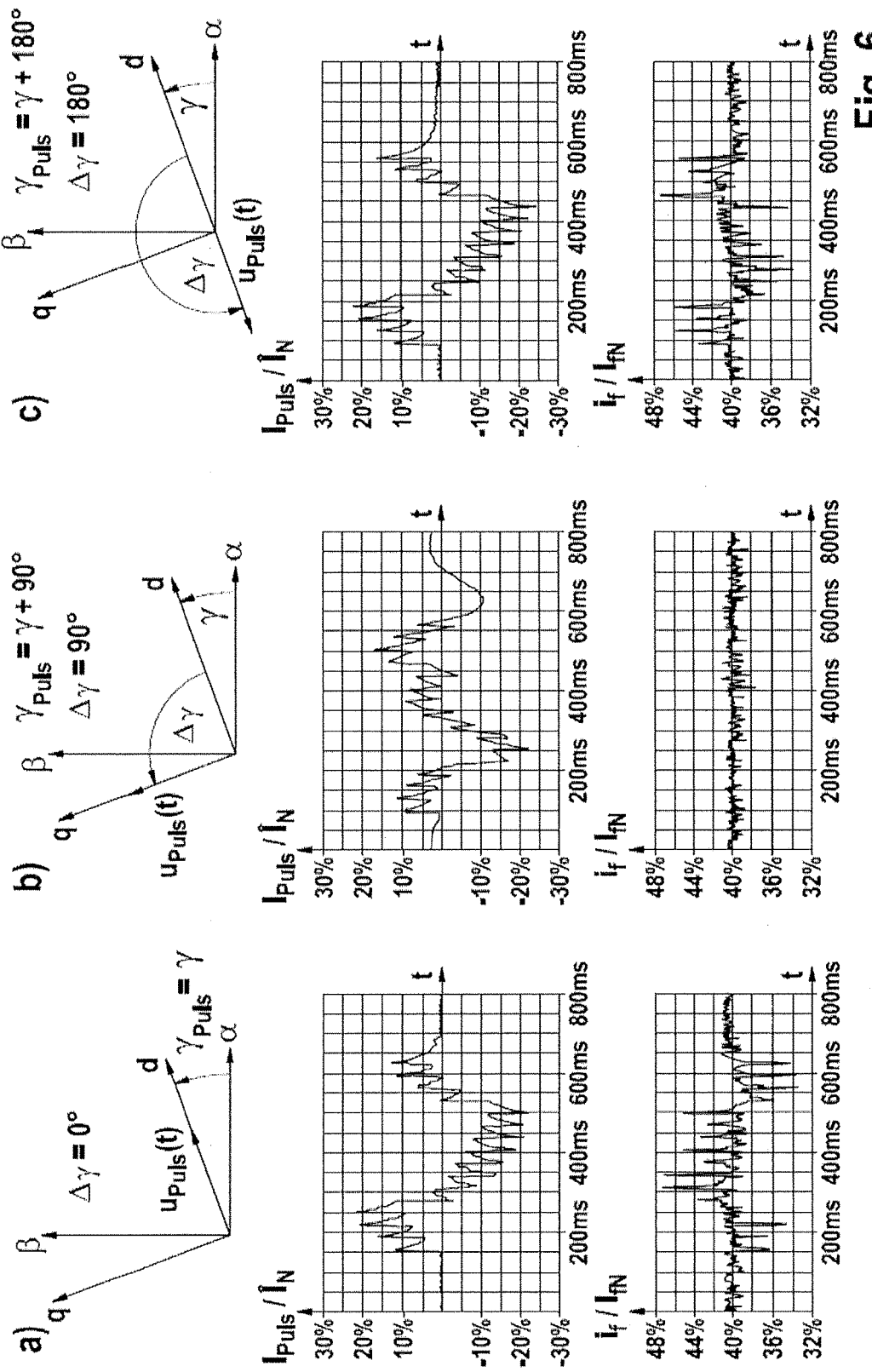
FIGS. 6a to 6c show pulse responses to an injected voltage test signal at different angular differences $\Delta\gamma=0°$, $\Delta\gamma=90°$ and $\Delta\gamma=180°$ with respect to the actual rotor position (d component of the excitation current)

FIGS. 6a to 6c illustrate the pulse responses of the stator current and the excitation current in the case of different angular differences $\Delta\gamma=0°$, $\Delta\gamma=90°$ and $\Delta\gamma=180°$. It is necessary for the evaluation of the current responses to the voltage test signals to concentrate the information about the temporal profile of the stator current and the excitation current in in each case one indicator variable. For this purpose, a stator current component in the pulse direction $i_{Puls}(t)$ is used to calculate the stator current indicator variable $i_{Puls,I}$ and an excitation current component is used to calculate the excitation current indicator variable $i_{f,I}$. The two new indicator variables $i_{Puls,I}$ and $i_{f,I}$ are calculated in step S2 as follows:

$$i_{Puls,I} = \frac{1}{T_{Puls}} \int_0^{T_{Puls}} i_{Puls}(t)\cos(2\pi f_{Puls}t)dt$$

$$i_{f,I} = \frac{1}{T_{Puls}} \int_0^{T_{Puls}} i_f(t)\cos(2\pi f_{Puls}t)dt$$

wherein $T_{Puls}$ corresponds to the period of the injected voltage test and $$f_{Puls} = \frac{1}{T_{Puls}}$$

corresponds to the frequency of the injected voltage test signal. The two indicator variables $i_{Puls,I}$ and $i_{f,I}$ thus introduced correspond to the coefficients of the discrete Fourier transformation for the fundamental wave of the stator current component and the excitation current component in the direction of the space vector angle of the injected voltage test signal.

The two indicator variables are calculated for each angle of the voltage test signals injected in step S1. In the following text, the indicator variables are illustrated as a function of the angle as $i_{Puls,1}(\gamma_{Puls})$, $i_{f,1}(\gamma_{Puls})$. In this case, $i_{Puls,1}(\gamma_{Puls})$ denotes the value of the stator current indicator which has been calculated in the case of the voltage test signal having the angle $\gamma_{Puls}$.

Figure 7:
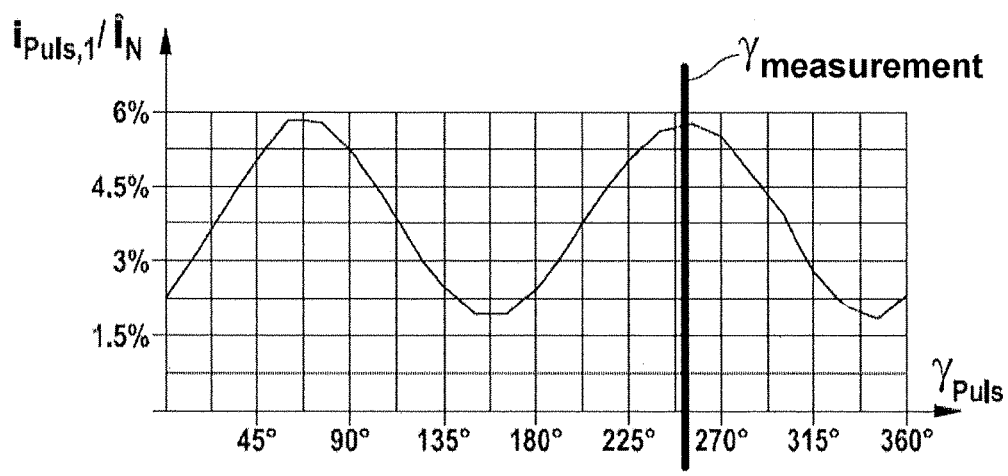
FIGS. 7a and 7b show normalized profiles of the stator current indicator variables and excitation current indicator variables over the space vector angle of the injected voltage pulse.
Figure 7:
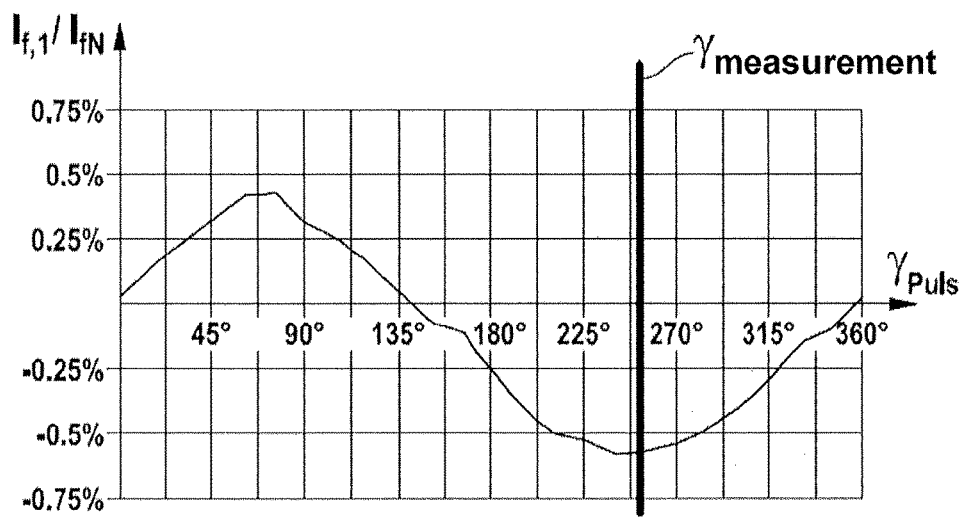

FIGS. 7a and 7b show by way of example the normalized profiles of the indicator variables $i_{Puls,I}$ and $i_{f,I}$ in the case of voltage test signals at different space vector angles, which have been injected into the stator winding 31 in 30°-steps of the space vector angle of the voltage test signals in the case of an electrical machine 3 which is at a standstill. The vertical line indicates the actual rotor position of the rotor 33 of the electrical machine 3.

The profiles of the indicator variables $i_{Puls,I}$ and $i_{f,I}$, which are shown in FIGS. 7a and 7b correspond to sampling in the case of various space vector angles which are spaced apart from one another $\Delta\gamma_{Puls}$, wherein $\cdot\Delta\gamma_{Puls}$ is 30° in the exemplary embodiment shown.

The overall profile of the indicator variables over the angle γ is now interpolated from the measured values of the indicator variables at the various angular positions. For this purpose it is assumed, in accordance with the illustration in FIG. 7a, that the stator current indicator $i_{Puls,I}(\gamma_{Puls})$ consists of a DC component and an AC component with the frequency of the second harmonic based on the angle $\gamma_{Puls}$. Since only the angular positions at which the stator current indicator variable has a local maximum are of importance for the rotor position detection, the DC component of the stator current indicator variable is not further taken into account in the following text.

Using the discrete Fourier transformation, the amplitudes of the even and odd component of the second harmonic of the stator current indicator ($i_{Puls,I,a2}$ and $i_{Puls,I,b2}$) can each be calculated in step S3 as follows:

$$i_{Puls,I,a2} = \frac{1}{n}\sum_{0}^{n-1} i_{Puls,I}(i\cdot\Delta\gamma_{Puls})\cos(2i\cdot\Delta\gamma_{Puls})$$

$$i_{Puls,I,b2} = \frac{1}{n}\sum_{0}^{n-1} i_{Puls,I}(i\cdot\Delta\gamma_{Puls})\sin(2i\cdot\Delta\gamma_{Puls})$$

Analogously, the values of the excitation current indicator variable $i_{f,I}(\gamma_{Puls})$ can also be interpolated, wherein no AC component with the second harmonic occurs here, rather with the fundamental oscillation instead. Thus, in step S3, the amplitudes of the even and odd component of the fundamental oscillation of the excitation current indicator variables $i_{f,I,a1}$ and $i_{f,I,b1}$ are each calculated as follows:

$$i_{f,I,a1} = \frac{1}{n}\sum_{0}^{n-1} i_{f,I}(i\cdot\Delta\gamma_{Puls})\cos(2i\cdot\Delta\gamma_{Puls})$$

$$i_{f,I,b1} = \frac{1}{n}\sum_{0}^{n-1} i_{f,I}(i\cdot\Delta\gamma_{Puls})\sin(2i\cdot\Delta\gamma_{Puls})$$

wherein $i_{Puls,I,a2}$ corresponds to an even Fourier coefficient of the second harmonic of the stator current indicator variable, $i_{Puls,I,b2}$ corresponds to an odd Fourier coefficient of the second harmonic of the stator current indicator variable, $i_{f,I,a1}$ corresponds to an even Fourier coefficient of the fundamental oscillation of the excitation current indicator variable, $i_{f,I,b1}$ corresponds to an odd Fourier coefficient of the fundamental oscillation of the excitation current indicator variable, n corresponds to the number of measurements, $\Delta\gamma_{Puls}$ corresponds to the angular spacing between the measurements, $i_{Puls,I}(i\cdot\Delta\gamma_{Puls})$ corresponds to a measured stator current indicator variable in the case of injection of a voltage test signal in, $\gamma_{Puls}=i\cdot\Delta\gamma_{Puls}$, $i_{f,I}(\gamma_{Puls})$ corresponds to a measured excitation current indicator variable in the case of injection of a voltage test signal in $\gamma_{Puls}=i\cdot\Delta\gamma_{Puls}$.

On the basis of the coefficients of the discrete Fourier transformation thus obtained, two evaluation methods A, B for evaluating the data can be differentiated in step S4.

Firstly, according to evaluation method A (step S4a), it may be sufficient in the case of particular configurations to use only the excitation current indicator variable. The rotor position can be calculated from the excitation current indicator variable, by precisely that angular position at which the excitation current indicator variable is smallest being calculated from the two now calculated excitation current indicator variables $i_{f,I,a1}$ and $i_{f,I,b1}$, as follows:

$$\gamma = \arctan 2(i_{f,I,b1}, i_{f,I,a1}) + 180°.$$

In the ideal case, this angular value corresponds exactly to the rotor position. However, the excitation current can only be directly measured in the case of electrical machines by means of excitation via slip rings and must be reconstructed on the basis of the stator currents of the excitation system in the case of brushlessly excited electrical machines. Calculation of the rotor position is correspondingly imprecise if the reconstruction of the excitation current contains errors.

Secondly, according to evaluation method B (step S4b), the rotor position can be calculated using the stator current indicator variable $i_{Puls,I}$. The rotor position γ is calculated from the stator current indicator variable $i_{Puls,I}$ with 180° ambiguity in step S4b.

According to the following relationship:

$$\gamma = \tfrac{1}{2} \arctan 2(i_{Puls,I,b1}, i_{Puls,I,a1})$$

one of the position angles γ of the rotor position can be computed, at which the stator current indicator variable has a local maximum. This position corresponds either to the angular position of the positive or negative d axis.

Subsequently, a further voltage pulse can be applied in the direction of the estimated rotor position (step S5b) in order to eliminate the 180° ambiguity by means of the mathematical sign of the then measured excitation current indicator variable $i_{f,I}$.

$$\gamma = \tfrac{1}{2} \arctan 2(i_{Puls,I,b1}, i_{Puls,I,a1})$$

In this case, a further voltage pulse is injected in the angular position calculated by means of the above equation and the excitation current indicator variable is calculated in accordance with $$i_{f,I} = \frac{1}{T_{Puls}} \int_0^{T_{Puls}} i_f(t)\cos(2\pi f_{Puls}t)dt.$$

By means of the mathematical sign of the excitation current indicator variable, the 180° ambiguity can now be eliminated. If the excitation current indicator variable is negative, the rotor position is in the angular position calculated previously. If the excitation current indicator variable is positive, the rotor position corresponds to a position which is offset by 180° with respect to the previously calculated angular position.

The selection of the angular spacings $\Delta\gamma_{Puls}$, at which the voltage test signals are injected in step S1, and the space vector measurements must take place such that the Fourier coefficients can be correctly calculated. In general, measurement values of the indicator variables must be present in the total angle range from 0 to 360°, $\eta\cdot\Delta\gamma_{Puls}=360°$, for the calculation of the coefficients (cf. step S1).

$$i_{f,I}(\gamma+180°) = i_{f,I}(\gamma)$$

Since the excitation current indicator variable is symmetrical, however, an angle range of $\eta\cdot\Delta\gamma_{Puls}=180°$ (cf. step S1) is already sufficient for correct illustration of the coefficients. The following applies to the stator current indicator $i_{Puls,f}(\gamma)$:

$$i_{Puls,f}(\gamma) = i_{Puls,f}(\gamma + 180°)$$

with the result that here, too, an angle range of 180° is sufficient to calculate the coefficients.

Furthermore, the angular spacings $\Delta\gamma_{Puls}$ should be selected such that they can easily be realized by the driver circuit 2. In the case of selection of an angular difference of $\Delta\gamma_{Puls} = 60°$ (n=3 or n=6), it is advantageous that only the natural switching states of the driver circuit 2 must be switched. The directions of the injected voltage test signals are therefore precisely in the directions in which the stator windings of the electrical machine 3 also lie. Above all, in the case of medium-voltage converters in which the realization of voltage test signals with a small amplitude in any direction is very imprecise, substantially more precise results are obtained by means of this selection of the angular difference.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

1 Motor system
2 Driver circuit
3 Electrical machine
4 Control unit
5 Phase lines
6 Excitation line
7 Excitation circuit
8 Device for measuring the phase currents
9 Device for measuring the excitation current
21 Semiconductor switch
22 Inverter circuits
23 B6 converter
31 Stator winding
32 Excitation winding
33 Rotor
71 Excitation current converter

The invention claimed is:

1. A method for determining a rotor position of an electrically excited electrical machine, the method comprising:
injecting voltage test signals at a plurality of space vector angles with a fundamental frequency which lies in a frequency range in which there is a difference in admittance in space vector angles;
calculating respective resulting values of an excitation current indicator variable as Fourier coefficients of an excitation current resulting from the voltage test signals with reference to the fundamental frequency of the voltage test signals at corresponding space vector angles; and
determining a rotor position based on a profile of the excitation current indicator variable.

2. The method according to claim 1, wherein the rotor position is determined at a position of a minimum of the profile of the excitation current indicator variable.

3. The method according to claim 2, comprising:
calculating amplitudes of odd and even components of a fundamental oscillation of the excitation current indicator variable, wherein the rotor position is calculated from the amplitudes of the odd and even components.

4. The method according to claim 1, comprising:
calculating the respective resulting values of a stator current indicator variable as Fourier coefficients of a stator current resulting from the voltage test signals with reference to the fundamental frequency of the voltage test signals at the corresponding space vector angles; and
determining the rotor position based on a respective profile of the stator current indicator variable and the excitation current indicator variable.

5. The method according to claim 4, comprising:
determining the rotor position as an angular position at which the profile of the stator current indicator variable has a local maximum and the corresponding excitation current indicator variable has a negative mathematical sign.

6. The method according to claim 5, comprising:
calculating amplitudes of odd and even components of a second harmonic of the stator current indicator variable, wherein an ambiguous indication of a rotor position is calculated from the amplitudes of the odd and even components, wherein a further voltage test signal is injected in a direction of a predefined estimated rotor position in order to eliminate an ambiguity of the ambiguous indication by a mathematical sign of a then measured excitation current indicator variable.

7. The method according to claim 6, wherein the voltage test signals are injected as periodic square-wave pulses.

8. The method according to claim 4, comprising:
calculating amplitudes of odd and even components of a second harmonic of the stator current indicator variable, wherein an ambiguous indication of a rotor position is calculated from the amplitudes of the odd and even components, wherein a further voltage test signal is injected in a direction of a predefined estimated rotor position in order to eliminate an ambiguity of the ambiguous indication by a mathematical sign of a then measured excitation current indicator variable.

9. The method according to claim 4, wherein the voltage test signals are injected as periodic square-wave pulses.

10. The method according to claim 1, wherein the voltage test signals are injected as periodic square-wave pulses.

11. The method according to claim 1, wherein the space vector angles are offset by 90°.

12. A non-transitory computer readable medium comprising a computer program product which contains a program code that, when executed on a data processing device, performs a method according to claim 1.

13. A device for determining a rotor position of an electrically excited electrical machine, wherein the device comprises a control unit structured to:
inject voltage test signals at a plurality of space vector angles with a fundamental frequency which lies in a frequency range in which there is a difference in admittance in space vector angles; and
calculate respective resulting values of an excitation current indicator variable as Fourier coefficients of an excitation current resulting from the voltage test signals with reference to the fundamental frequency of the voltage test signals at corresponding space vector angles, and determine a rotor position based on a profile of the excitation current indicator variable.

14. The device according to claim 13, wherein the space vector angles are offset by 90°.

* * * * *